US012157695B2

(12) United States Patent
Fedurco et al.

(10) Patent No.: US 12,157,695 B2
(45) Date of Patent: Dec. 3, 2024

(54) BONDING A GLASS-RESIN COMPOSITE MONOFILAMENT TO A THERMOPLASTIC MATRIX

(71) Applicant: COMPAGNIE GENERALE DES ETABLISSEMENTS MICHELIN, Clermont-Ferrand (FR)

(72) Inventors: Milan Fedurco, Clermont-Ferrand (FR); Antonio Delfino, Clermont-Ferrand (FR); Marcel Tornare, Clermont-Ferrand (FR)

(73) Assignee: COMPAGNIE GENREALE DES ETABLISSEMENTS MICHELIN, Clermont-Ferrand (FR)

( * ) Notice: Subject to any disclaimer, the term of this patent is extended or adjusted under 35 U.S.C. 154(b) by 861 days.

(21) Appl. No.: 17/297,824

(22) PCT Filed: Nov. 27, 2019

(86) PCT No.: PCT/FR2019/052818
§ 371 (c)(1),
(2) Date: May 27, 2021

(87) PCT Pub. No.: WO2020/109723
PCT Pub. Date: Jun. 4, 2020

(65) Prior Publication Data
US 2022/0024811 A1 Jan. 27, 2022

(30) Foreign Application Priority Data

Nov. 30, 2018 (FR) ........................................ 1872104
Feb. 5, 2019 (FR) ........................................ 1901093

(51) Int. Cl.
*C03C 14/00* (2006.01)
*C03C 25/27* (2018.01)
*C08L 79/04* (2006.01)

(52) U.S. Cl.
CPC .............. *C03C 14/00* (2013.01); *C08L 79/04* (2013.01)

(58) Field of Classification Search
CPC ................................ C03C 14/00; C03C 25/27
See application file for complete search history.

(56) References Cited

U.S. PATENT DOCUMENTS

| 5,543,516 A | 8/1996 | Ishida |
| 6,875,297 B1 | 4/2005 | Meuwly et al. |

(Continued)

FOREIGN PATENT DOCUMENTS

| EP | 1167080 A1 | 2/2001 |
| EP | 1074369 A1 | 1/2002 |

(Continued)

OTHER PUBLICATIONS

Y. Yaggi, et al., "Recent Advancement on Polybenzoxazine—A Newly Developed High Performance Thermoset", J. Polymer Sci.: Part A: Polymer Chem., vol. 47, 5565-5576 (2009).

(Continued)

*Primary Examiner* — Matthew E. Hoban
(74) *Attorney, Agent, or Firm* — VENABLE LLP

(57) ABSTRACT

Use of a benzoxazine resin (12) for the bonding of a monofilament (10) made of glass-resin composite including glass filaments (101) embedded in a thermosetting polyester resin (102), to a thermoplastic material (14), notably polyester; process for adhering such a monofilament to the thermoplastic material (14), including at least the following steps: —impregnating the monofilament (10) with a benzoxazine resin (12) in the liquid state; —after impregnation, heat-treating the monofilament (10) thus impregnated, so as to at least partly polymerize the benzoxazine resin (12); —depositing, onto the monofilament (10) thus adhesively coated, the thermoplastic material (14) in the molten state;

(Continued)

—after cooling, optionally heat-treating the monofilament thus coated (R-1, R-2) to totally polymerize the benzoxazine resin (12) on contact with the thermoplastic material (14).

17 Claims, 9 Drawing Sheets

(56) References Cited

U.S. PATENT DOCUMENTS

| | | | |
|---|---|---|---|
| 6,926,853 | B2 | 8/2005 | Hinc et al. |
| 7,032,637 | B2 | 4/2006 | Meraldi |
| 7,484,949 | B2 | 2/2009 | Hinc et al. |
| 10,259,266 | B2 | 4/2019 | Delfino |
| 10,549,580 | B2 | 2/2020 | Fedurco et al. |
| 10,800,795 | B2 | 10/2020 | Fedurco et al. |
| 10,975,044 | B2 | 4/2021 | Fedurco et al. |
| 10,994,573 | B2 | 5/2021 | Delfino |
| 10,995,076 | B2 | 5/2021 | Fedurco et al. |
| 11,155,540 | B2 | 10/2021 | Fedurco et al. |
| 11,247,510 | B2 | 2/2022 | Fedurco et al. |
| 11,306,229 | B2 | 4/2022 | Fedurco et al. |
| 11,370,935 | B2 | 6/2022 | Fedurco et al. |
| 2002/0043319 | A1 | 4/2002 | Meraldi |
| 2003/0015827 | A1 | 1/2003 | Hinc et al. |
| 2005/0173823 | A1 | 8/2005 | Hinc et al. |
| 2012/0251823 | A1* | 10/2012 | Maldonado ........... B29C 70/504 428/394 |
| 2015/0141583 | A1 | 5/2015 | Arai et al. |
| 2016/0159152 | A1 | 6/2016 | Delfino et al. |
| 2016/0185051 | A1 | 6/2016 | Delfino et al. |
| 2016/0318342 | A1* | 11/2016 | Delfino ................. D02G 3/48 |
| 2017/0050468 | A1 | 2/2017 | Delfino |
| 2018/0009264 | A1 | 1/2018 | Delfino |
| 2018/0170109 | A1 | 6/2018 | Delfino |
| 2018/0370284 | A1 | 12/2018 | Fedurco et al. |
| 2019/0300765 | A1 | 10/2019 | Fedurco et al. |
| 2020/0095458 | A1 | 3/2020 | Fedurco et al. |
| 2020/0208010 | A1 | 7/2020 | Fedurco et al. |
| 2020/0290402 | A1 | 9/2020 | Fedurco et al. |
| 2021/0146725 | A1 | 5/2021 | Fedurco et al. |
| 2022/0002088 | A1* | 1/2022 | Whitehead ................ B32B 5/26 |
| 2022/0002194 | A1 | 1/2022 | Fedurco et al. |
| 2022/0009286 | A1 | 1/2022 | Fedurco et al. |

FOREIGN PATENT DOCUMENTS

| | | |
|---|---|---|
| EP | 1174250 A1 | 1/2002 |
| WO | 2013/148408 A1 | 10/2013 |
| WO | 2014/004900 A2 | 1/2014 |
| WO | 2015/014578 A1 | 2/2015 |
| WO | 2015/014579 A1 | 2/2015 |
| WO | 2015/090973 A1 | 6/2015 |
| WO | 2015/165777 A1 | 11/2015 |
| WO | 2016/116457 A1 | 7/2016 |
| WO | 2016/189126 A1 | 12/2016 |
| WO | 2016/189209 A1 | 12/2016 |
| WO | 2017/103375 A1 | 6/2017 |
| WO | 2017/103376 A1 | 6/2017 |
| WO | 2018/078227 A1 | 5/2018 |
| WO | 2018/078228 A1 | 5/2018 |

OTHER PUBLICATIONS

N.N. Ghosh, et al., "Polybenzoxazines—New high performance thermosetting resins: Synthesis and properties", Prog. Polym. Sci., vol. 32, 1344-1391 (2007).

International Search Report dated Apr. 30, 2020, in corresponding PCT/FR2019/052818 (6 pages).

* cited by examiner (a-1)

(a-2)

(a-3)

(a-4)

(a-5)

(a-6)

Monomer M (b-1)

(b-2)

(b-3)

(f-1)

(f-2)

BONDING A GLASS-RESIN COMPOSITE MONOFILAMENT TO A THERMOPLASTIC MATRIX

FIELD OF THE INVENTION

The field of the present invention is that of composite materials based on monofilaments of the "GRC" type (abbreviation for Glass-Resin Composite) with high mechanical and thermal properties, including continuous unidirectional multifilament glass fibres embedded in a polyester thermosetting resin.

The invention relates particularly to such composite materials in the form of longilinear reinforcing elements or "reinforcers", which may notably be used for reinforcing semi-finished products or finished articles made of rubber such as vehicle tyres, and more particularly to the bonding of these composite materials or reinforcers to thermoplastic materials.

PRIOR ART

Patent EP 1 167 080 (or U.S. Pat. No. 7,032,637) has already described GRC monofilaments with very high mechanical properties, including continuous unidirectional glass fibres, impregnated in a polyester resin matrix of the thermosetting type, in particular vinyl ester. Said patent application demonstrated that it was advantageously possible, by virtue of these very high properties, to replace steel cables with such GRC monofilaments, as reinforcers for pneumatic tyres, thus making it possible to appreciably lighten the structure of these tyres.

More recently, patent applications WO 2015/014578 and WO 2015/014579, filed by the Applicant, described GRC monofilaments with further improved physical and mechanical properties, obtained by means of a specific production process.

Finally, patent applications WO 2015/090973, WO 2015/165777, WO 2016/116457, WO 2016/189209 and WO 2016/189126, filed by the Applicant, also described multicomposite reinforcers based on such GRC monofilaments with, this time, a layer of a thermoplastic material individually covering each monofilament or collectively a packet of several monofilaments. This layer of thermoplastic material proved, notably by means of a supposed hooping effect, to give these composite reinforcers compression, flexural or transverse shear properties that were appreciably improved, in particular at high temperature, relative to those of the GRC monofilaments known hitherto.

Experience shows, however, that these multicomposite materials or reinforcers based on GRC monofilaments can be further improved, notably as regards their adhesion to thermoplastic materials.

In addition, it turns out that, despite their excellent mechanical strength, GRC monofilaments could, under extreme conditions of use such as very substantial flexural, compression or shear phenomena, or else severe abrasion, notably in a penalizing thermal and/or chemical environment, be exposed to more or less pronounced risks of delamination, potentially accompanied at the surface by migration of certain glass filaments to the exterior of the monofilament, with a risk of crack propagation.

BRIEF DESCRIPTION OF THE INVENTION

In the continuation of its research, the Applicant has discovered a means for further improving the performance of these composite GRC materials or reinforcers, by coating the monofilaments with a specific intermediate layer, before sheathing them with the layer of thermoplastic material described above.

Thus, according to a first subject, the present invention relates (with reference, for example, to the attached FIGS. 1 and 2) to the use of a benzoxazine resin (12) for the bonding of a GRC monofilament (10) including glass filaments (101) embedded in a thermoset polyester resin (102) to a thermoplastic material (14).

In comparison with the prior art presented above, the use of benzoxazine resin proved to have several virtues:
  first, it has very good chemical compatibility with the thermoset polyester resin of the monofilament, the key element being excellent adhesion of the benzoxazine to the GRC monofilament;
  by virtue of this excellent adhesion associated with the fact that the two unsaturated resins (polyester and benzoxazine) have tensile modulus values of the same order of magnitude, the capacity for repairing, hooping and thus reinforcing the GRC monofilament at the periphery without harming the overall mechanical properties of the matrix;
  finally it affords the GRC monofilament improved adhesion to a sheathing layer made of thermoplastic material, in comparison with the solutions described in the abovementioned patent applications WO 2015/090973, WO 2015/165777, WO 2016/116457, WO 2016/189209 and WO 2016/189126.

The invention also relates to a process for adhering a GRC monofilament (10) including glass filaments (101) embedded in a thermosetting polyester resin (102) to a thermoplastic material (14) covering said GRC monofilament, including at least the following steps:
  impregnating the monofilament (10) with a benzoxazine resin (12) in the liquid state;
  after impregnation, heat-treating the monofilament (10) thus impregnated, so as to at least partly polymerize the benzoxazine resin (12);
  depositing, onto the monofilament (10) thus adhesively coated, the thermoplastic material (14) in the molten state;
  after cooling, optionally heat-treating the monofilament thus coated (R-1, R-2) to totally polymerize the benzoxazine resin (12) on contact with the thermoplastic material (14).

BRIEF DESCRIPTION OF THE DRAWINGS

The invention and its advantages will be readily understood in the light of the detailed description and implementation examples that follow, and also of the figures relating to these examples which diagrammatically represent (without being true to scale, so as not to harm the clarity of the presentation):
  in cross section, a GRC monofilament (10) that can be used in the invention (FIG. 1);
  in cross section, two examples (R-1 and R-2) of multicomposite materials or reinforcers obtained according to the process of the invention (FIG. 2);
  in cross section, another example of a GRC monofilament (20) that can be used in the invention (FIG. 3);
  in cross section, another example (R-3) of a multicomposite material obtained according to the process of the invention (FIG. 4);
  the general principle for the synthesis of a benzoxazine from three compounds, phenol, formaldehyde and amine (residue R of the amine) and the mechanism of opening, by supply of heat, of the oxazine ring of such a benzoxazine (FIG. 5);

six examples of monobenzoxazines of formula (A) with various examples of radicals R, of particular formulae (a-1) to (a-6) (FIG. 6);

Figure 7:
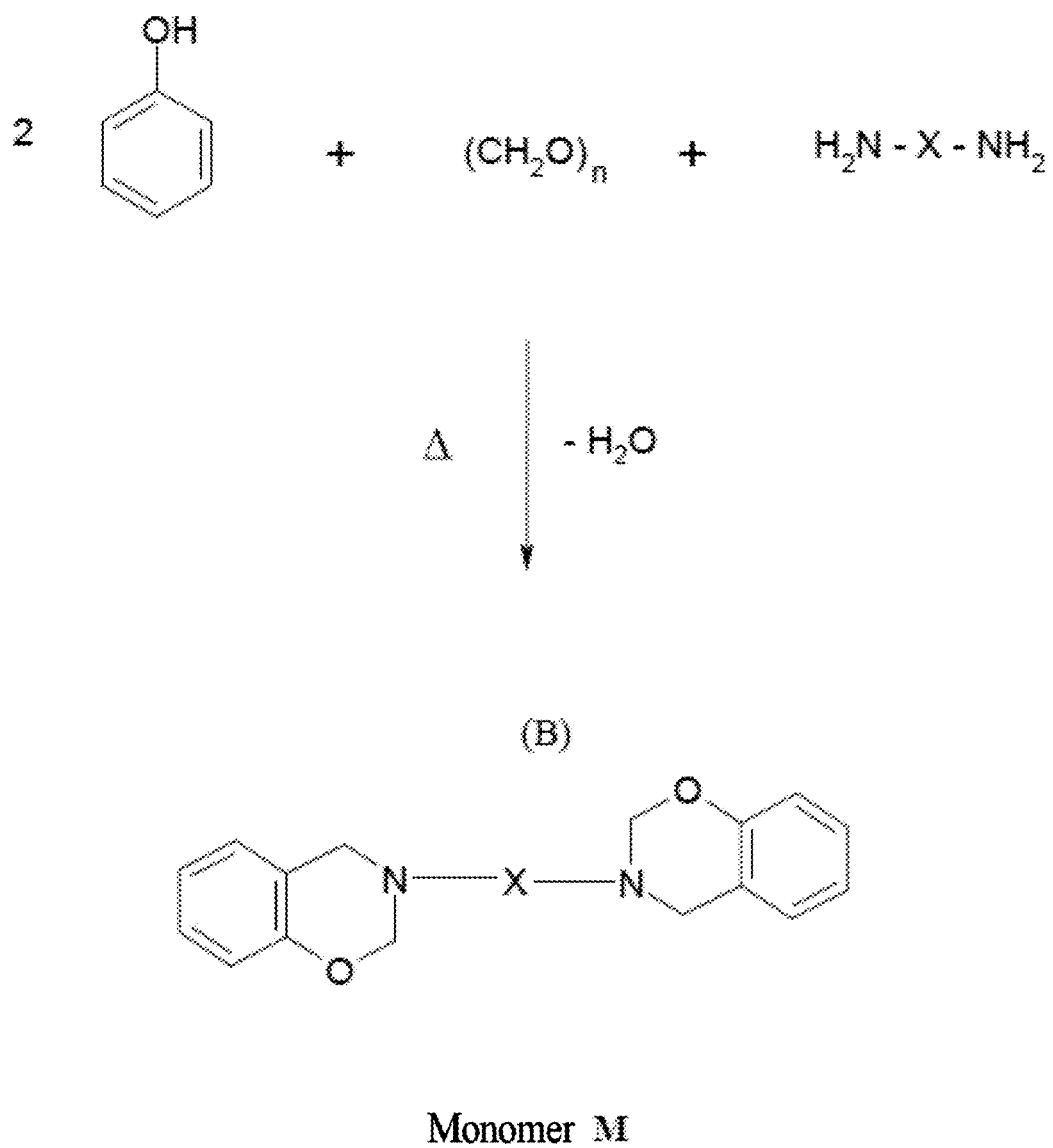
Figure 8:
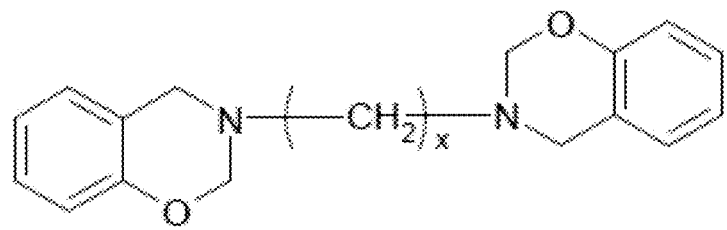
Figure 8:
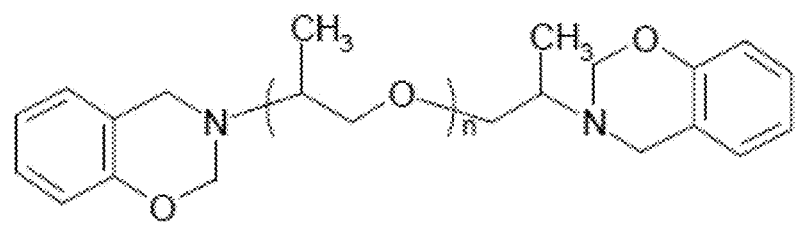
Figure 8:
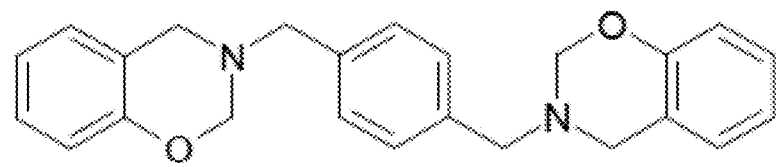
Figure 9:
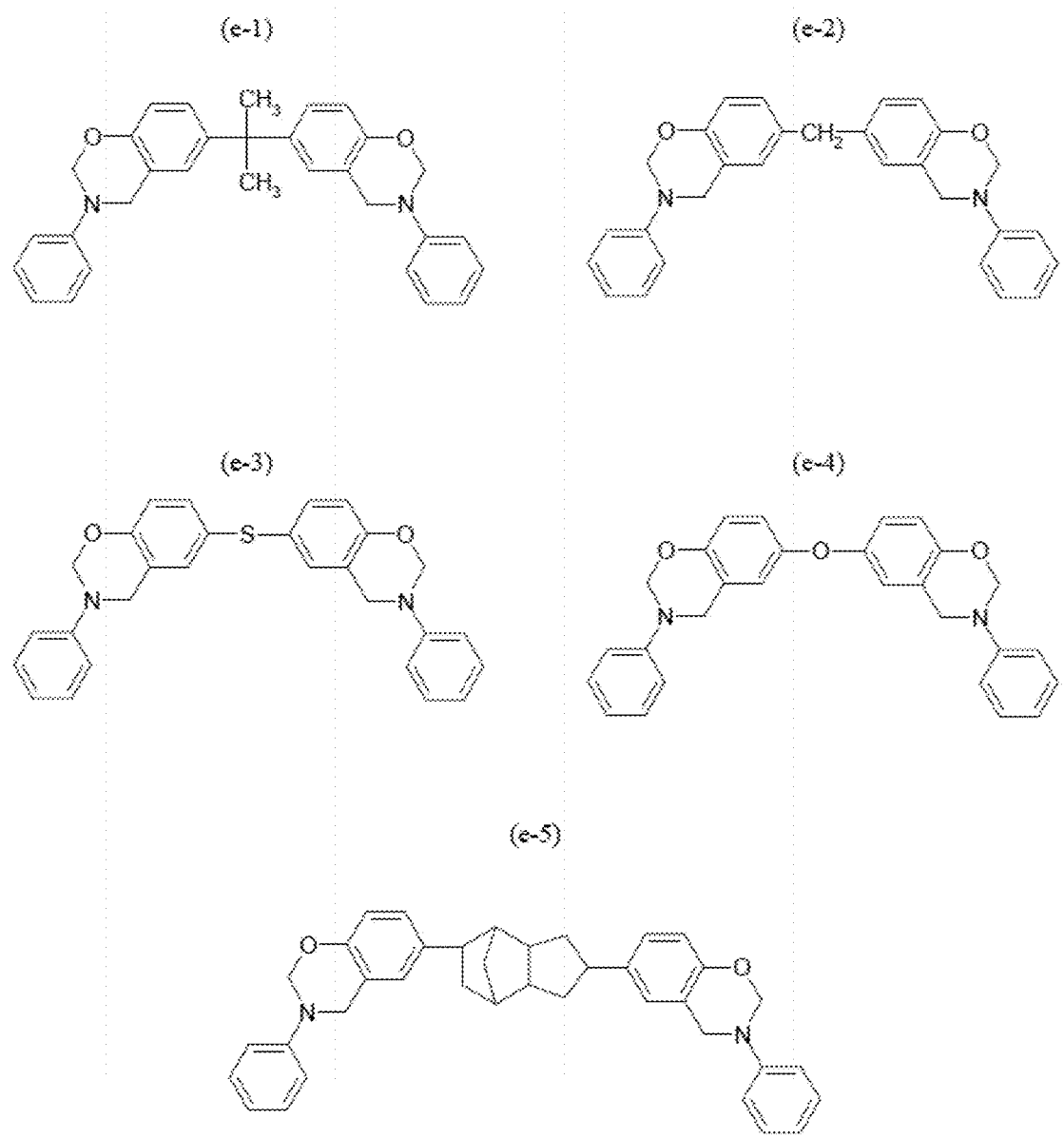
Figure 10:
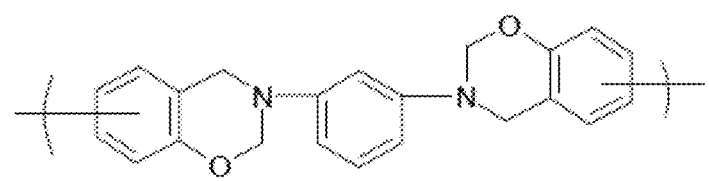
Figure 10:
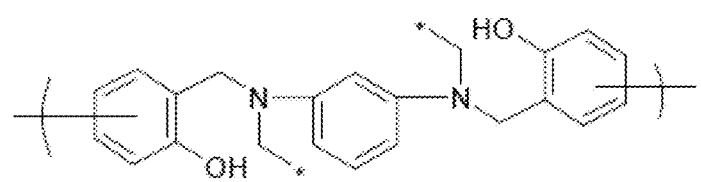
Figure 11:
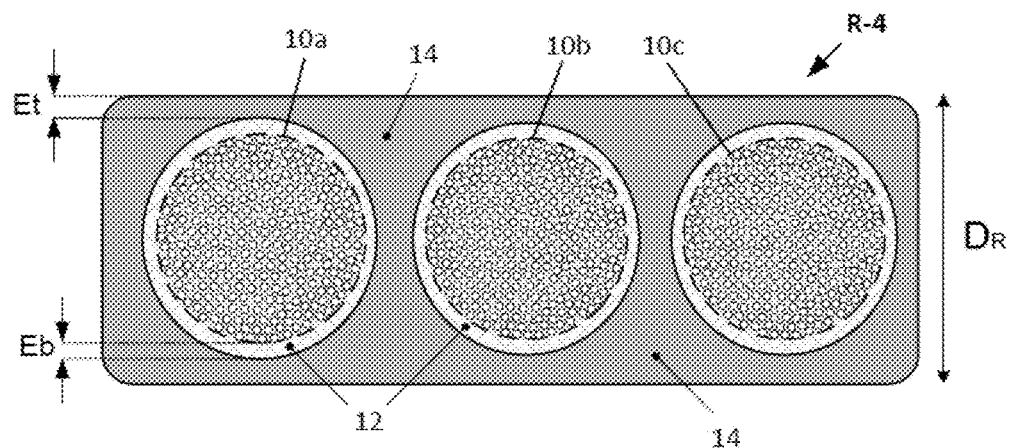
Figure 12:
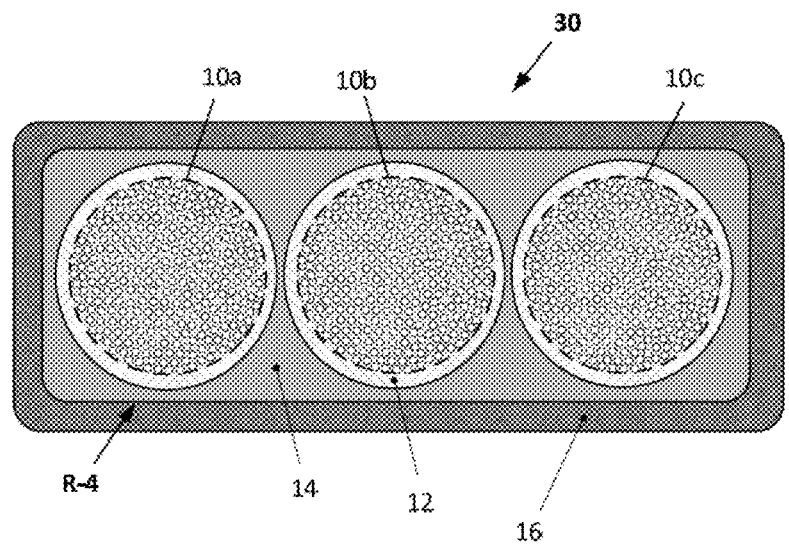
Figure 13:
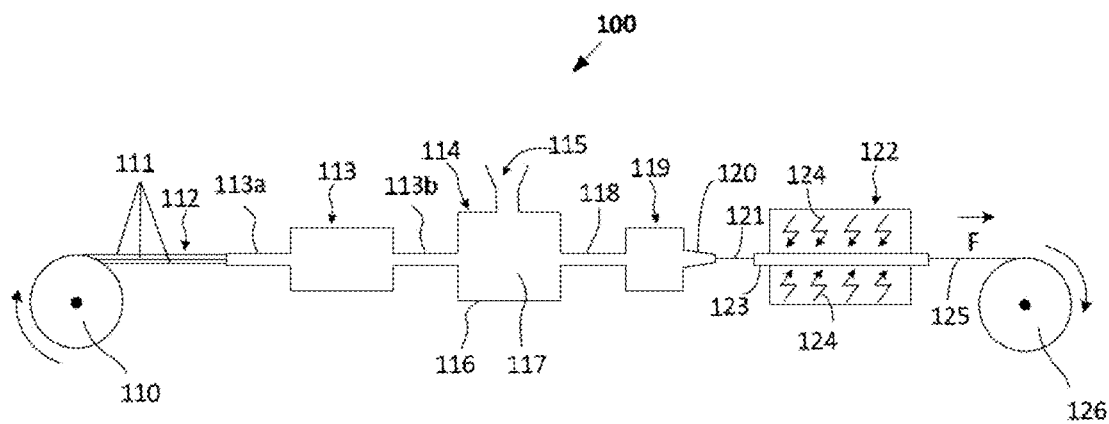

a general scheme for the synthesis, starting with three compounds, phenol, paraformaldehyde and a specific diamine, of a bis-benzoxazine of formula (B) (monomer noted "M") (FIG. 7);

three examples of bis-benzoxazines of formula (B) above with various bonding groups Z, of particular formulae (b-1) to (b-3) (FIG. 8);

five examples of bis-benzoxazines of formula (E) with various bonding groups Z, of particular formulae (e-1) to (e-5) (FIG. 9);

two examples of repeating polybenzoxazine units, of respective general formulae (F-I) and (F-II) and of particular formulae (f-1) and (f-2) in which Z represents, by way of example, a phenylene group (FIG. 10);

in cross section, another example (R-4) of a multicomposite material or reinforcer being able to be obtained according to the invention, in the form of a strip of three parallel GRC monofilaments (10a, 10b, 10c), each coated with their first benzoxazine adhesive layer (12) and with a layer of a thermoplastic material (14) as peripheral sheathing layer (FIG. 11);

in cross section, an example (30) of a multilayer laminate including the reinforcer (R-4) coated with a rubber matrix (16) (FIG. 12);

finally, a device for manufacturing a GRC monofilament (10) that can be used as a base constituent element of a multicomposite material or reinforcer obtained according to the process of the invention (FIG. 13).

DETAILED DESCRIPTION OF THE INVENTION

In the present patent application, unless expressly indicated otherwise, all the percentages (%) shown are mass percentages.

Any range of values denoted by the expression "between a and b" represents the field of values ranging from more than "a" to less than "b" (that is to say limits "a" and "b" excluded) whereas any range of values denoted by the expression "from a to b" means the field of values ranging from "a" up to "b" (that is to say including the strict limits "a" and "b"). The expression "x and/or y" used to describe different implementation variants covers three variants, "x" or "y" or "x and y".

The invention thus relates (with reference, for example, to FIGS. 1 and 2) to the use of a benzoxazine resin (12) for the bonding of a (at least one) GRC monofilament (10) including glass filaments (101) embedded in a thermosetting polyester resin (102), to a thermoplastic material (14) intended finally to cover said GRC monofilament.

The invention also relates to a process for adhering at least one (i.e. one or more) GRC monofilament (10) including glass filaments (101) embedded in a thermosetting polyester resin (102) to a thermoplastic material (14), including at least the following steps:

impregnating the monofilament (10) with a benzoxazine resin (12) in the liquid state;

after impregnation, heat-treating the monofilament (10) thus impregnated, so as to at least partly polymerize the benzoxazine resin (12);

depositing, onto the monofilament (10) thus adhesively coated, the thermoplastic material (14) in the molten state;

after cooling, optionally heat-treating the monofilament thus coated (R-1, R-2) to totally polymerize the benzoxazine resin (12) on contact with the thermoplastic material (14).

The composite material or reinforcer obtained according to the process of the invention may include only one or a plurality of GRC monofilaments known in the prior art, with, which constitutes an essential characteristic of the invention, the use of a first layer (12) of benzoxazine individually covering the monofilament (each monofilament or, collectively, a packet of several monofilaments in the case of several monofilaments), and a second layer (14) of thermoplastic material covering the whole; in the case of several monofilaments, the second layer (14) may itself individually cover each monofilament coated with its layer (12) of benzoxazine, or collectively a packet of several monofilaments coated (individually or collectively) with their layer (12) of benzoxazine.

The structure of the multicomposite material or reinforcer obtained according to the invention is described in detail hereinbelow.

Firstly, the elemental GRC monofilament that constitutes the multicomposite material obtained according to the invention may take any known form; for example, it may be a cylindrical monofilament of large diameter (for example greater than 100 μm, typically from a few hundred μm to a few mm), that is to say of essentially circular cross section, or else an elemental strip of essentially rectangular (including square) cross section, it being understood that at least one layer of benzoxazine individually covers said monofilament or each monofilament.

Figure 1:
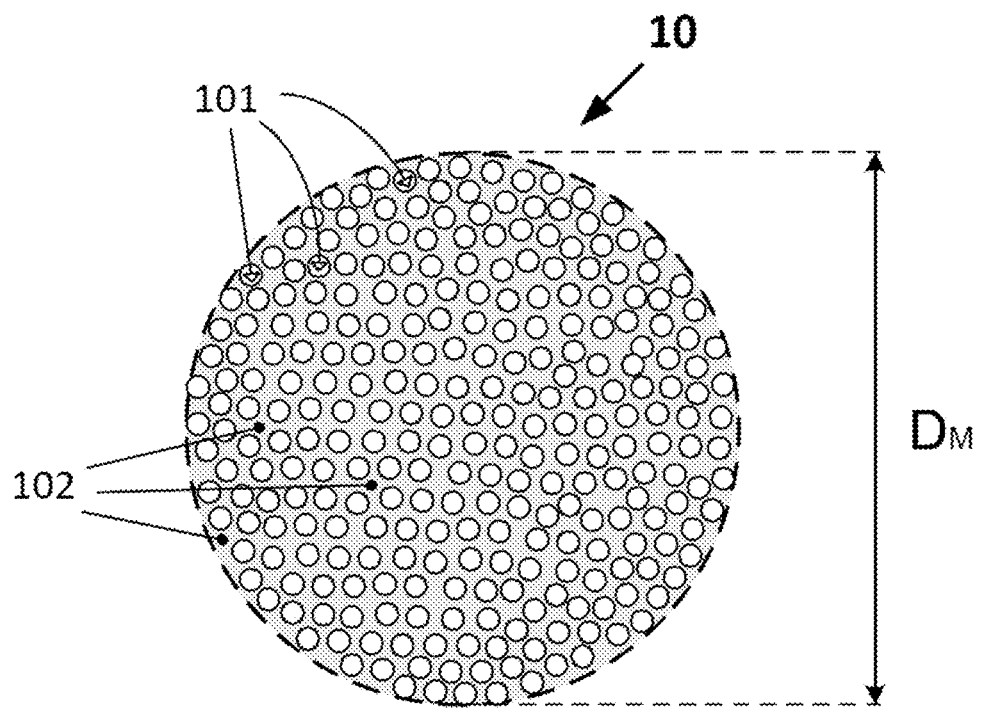

FIG. 1 shows in cross section a starting GRC monofilament (10) which can serve in the invention for the manufacture of a multicomposite material or reinforcer. The latter, of diameter $D_M$, of the filiform type, i.e. of very great length relative to its cross section, includes in a known manner individual glass filaments (101) which are uniformly distributed throughout the volume of cured polyester resin (102).

Typically, the glass filaments are present in the form of a single multifilament fibre or several multifilament fibres (if there are several, they are preferably essentially unidirectional), each of them possibly including several tens, hundreds or even thousands of individual glass filaments (101). These very fine individual filaments generally, and preferably, have a mean diameter of the order of 5 to 30 μm, more preferentially from 10 to 20 μm.

In the present patent application, the term "thermoset polyester resin" or "polyester resin" means, in a well known manner, a polyester resin in a "cured" and thus polymerized form, irrespective of the polymerization method used (notably a photochemical and/or thermal route), i.e. obtained from an unsaturated polyester; it is in the form of a network of three-dimensional bonds, in an irreversible state intrinsic to "thermosetting" polymers (as opposed to "thermoplastic" polymers).

It should also be understood that such a term encompasses, needless to say, a polyester resin per se (i.e. without additive) and any composition based on a (at least one) polyester resin and including at least one (i.e. one or more) additive, for instance dyes, fillers, plasticizers, solvents, crosslinking agents, anti-ageing agents such as antioxidants or antiozonants.

Figure 2:
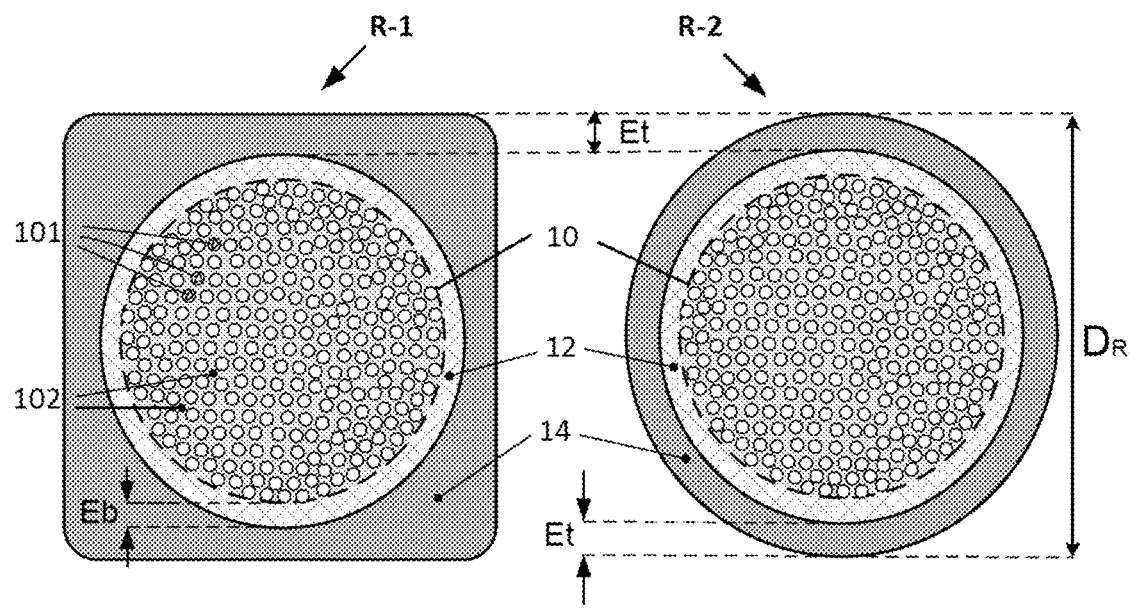

FIG. 2 depicts, in cross section, two examples (R-1 and R-2) of multicomposite materials obtained according to the invention, in which a single GRC monofilament (10) as described previously, for example having a diameter $D_M$ equal to 1 mm, was covered with its first layer (12) of benzoxazine resin, having a minimum thickness denoted Eb, measured at the back of each monofilament, then covered with the second layer (14) of thermoplastic material, having a minimum thickness denoted Et; in these two examples, the cross section of the multicomposite material is either rectangular (here essentially square) or circular (respectively reinforcers R-1 and R-2); needless to say, it may take various other forms, for example an oblong form.

Figure 3:
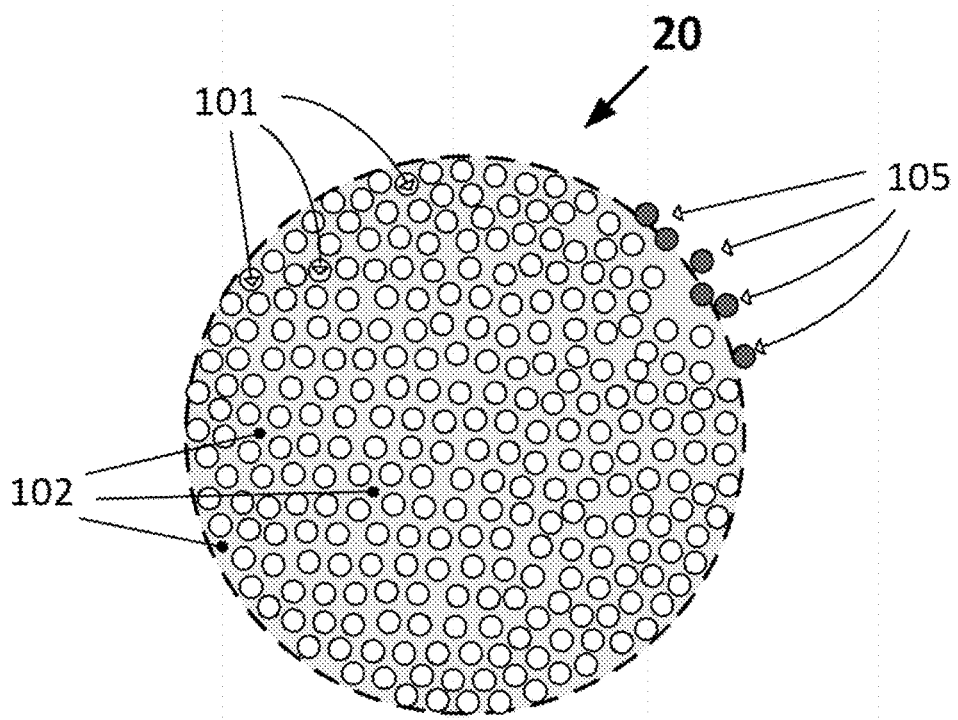

FIG. 3 shows another example of a starting GRC monofilament (20) which can serve in the invention for the manufacture of another multicomposite material or reinforcer. This figure clearly illustrates the problem described previously of possible defects appearing at the surface or periphery of certain GRC monofilaments (delamination, migration of certain filaments, crack propagation, etc.) which are manifested here, for example, by migration to the surface of glass filaments (105) following possible manufacturing defects, external attacks such as cracks that are liable to appear and to propagate at the very stage of manufacture or during the various steps of subsequent implementation of these GRC monofilaments.

Figure 4:
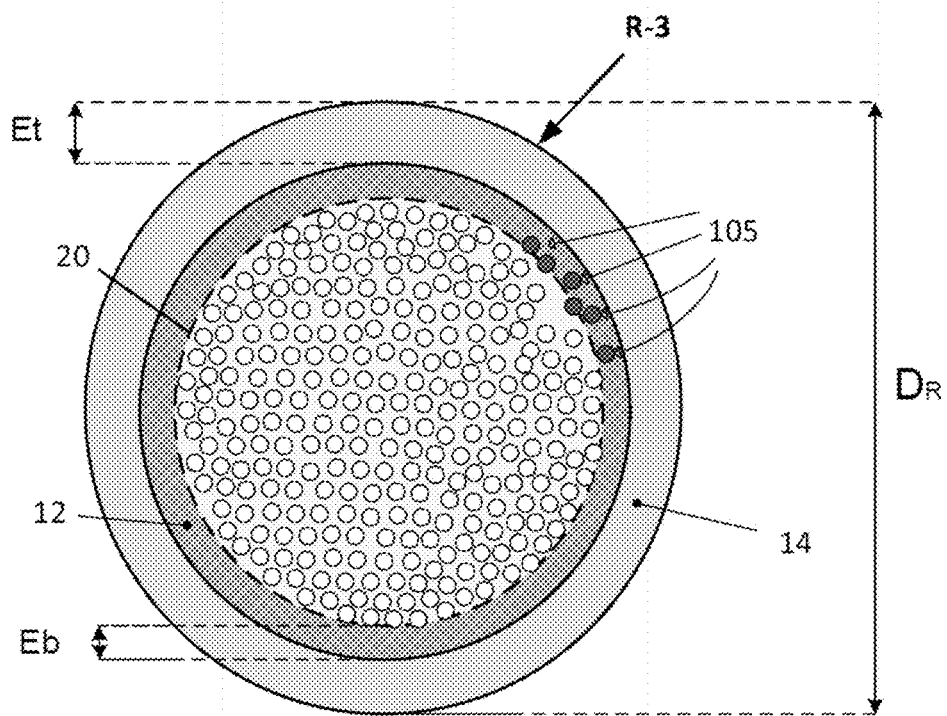

FIG. 4 illustrates the advantage of the invention, with, in cross section, an example (R-3) of a multicomposite material obtained according to the invention including the preceding GRC monofilament (20), provided with its two layers (12, 14) at its periphery. A major advantage of the benzoxazine layer (12) is that, once polymerized, said layer notably has a tensile modulus of the same order of magnitude as that of the polyester resin (102). This very good compatibility between the two polyester and polybenzoxazine resins explains why the GRC monofilament (20) as described previously, embrittled by the migration to the surface of glass filaments (105) following accidental cracking, for example, can be easily repaired or protected by this benzoxazine layer or sheath (12).

In the present patent application, the term "benzoxazine" or "benzoxazine resin" means any benzoxazine monomer, oligomer, polymer (homopolymer and/or copolymer: i.e. polybenzoxazine) compound, or any mixture of these products, and also any monomeric or polymeric composition including such a monomeric, oligomeric and/or polymeric compound, and at least one additive; as examples of additives, mention may notably be made of dyes, fillers, plasticizers, solvents, crosslinking agents and anti-ageing agents.

It will first of all be recalled that benzoxazines are well-known compounds of general formula:

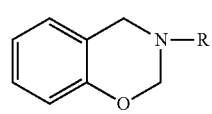

(A)

Figure 5:
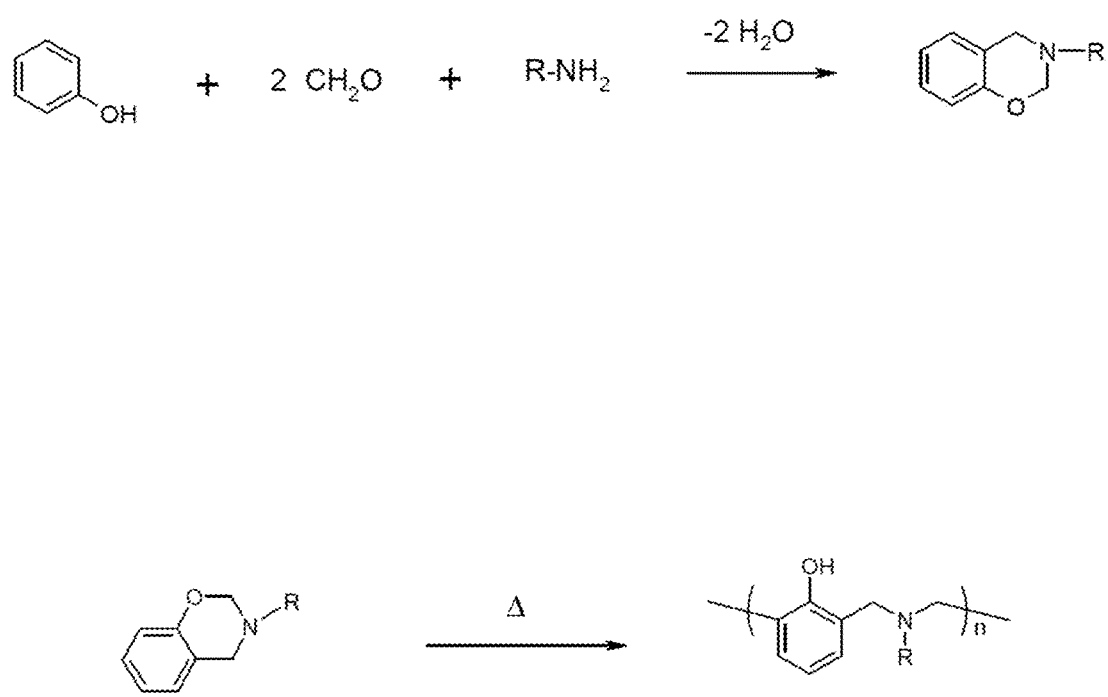

FIG. 5 firstly recalls the general principle for the synthesis of a benzoxazine, in this instance starting (condensation reaction) from a phenol molecule, two formaldehyde molecules and an amine (R denoting the amine residue), with elimination of two water molecules, followed by the mechanism of opening of the oxazine ring of such a compound during the supply of heat (represented by the symbol A), or even photochemically.

Numerous benzoxazine compounds or monomers may thus be synthesized using various phenols and amines according to their types of substituents. These substituting groups may subsequently provide polymerizable sites and allow the synthesis of various benzoxazine polymers (or polybenzoxazines).

Benzoxazines and polybenzoxazines which result therefrom are products which are today well known to those skilled in the art; to cite but a few publication examples, mention may be made of the articles "Polybenzoxazines—New high performance thermosetting resins: synthesis and properties"; N. N. Ghosh et al., Prog. Polym. Sci. 32 (2007), 1344-1391, or "Recent Advancement on Polybenzoxazine—A Newly Developed High Performance Thermoset", Y. Yaggi et al., J. Polym. Sci. Part A: Polym. Chem.: Vol. 47 (2009), 5565-5576, and also, for example, of the patents or patent applications U.S. Pat. No. 5,543,516 and WO 2013/148408.

Examples that may also be mentioned include the patent applications WO 2017/103375, WO 2017/103376, WO 2018/078227 and WO 2018/078228, filed by the Applicant, relating to specific benzoxazines and polybenzoxazines which have been specifically developed for coating metal, in particular as adhesion primers for the bonding of metal reinforcers such as steel cords to unsaturated rubbers such as diene elastomers.

However, to the Applicant's knowledge, benzoxazines and/or polybenzoxazines have never been described hitherto as being able to serve as coating, what is more as coating that is polyfunctional, for GRC monofilaments.

As already known, explained in detail in the various abovementioned documents, polybenzoxazines have the remarkable ability, at high temperature (for example typically above 150° C. or even above 200° C. depending on their particular microstructure), to open their oxazine rings and to thus result in thermosetting polyphenolic resin structures. This gives them excellent thermal stability, with no visible phase transition at temperatures that may exceed 200° C.; their microstructure can be widely adapted to make it possible, very advantageously, to adjust the flexibility of the molecule and thus of the targeted coating layer, depending on the particular applications envisaged.

According to a first preferential embodiment, the benzoxazine layer (12) includes at least one (i.e. one or more) benzoxazine compound (or monomer).

This benzoxazine compound may include only one oxazine ring (in the case of a monooxazine), two oxazine rings (in the case of a bis-benzoxazine or dibenzoxazine), or even more than two oxazine rings, according to the number of $NH_2$ groups on the starting amine.

This benzoxazine may in particular be a simple monobenzoxazine of very general formula:

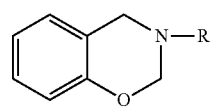

(A)

in which R (denoting, as a reminder, the residue of the starting amine) represents a hydrocarbon-based radical which may include a heteroatom (for instance S, O, N and P), notably an alkyl (for example methyl), cycloalkyl (for example hexyl) or aryl (for example phenyl); R may also include, for example, unsaturated double or triple bonds.

Figure 6:
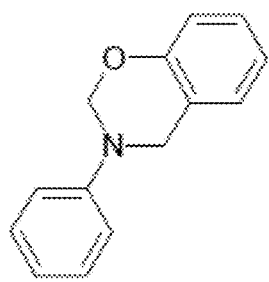
Figure 6:
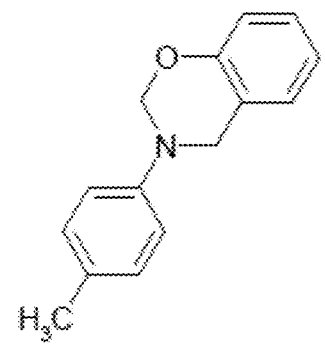
Figure 6:
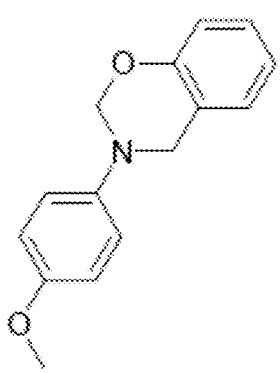
Figure 6:
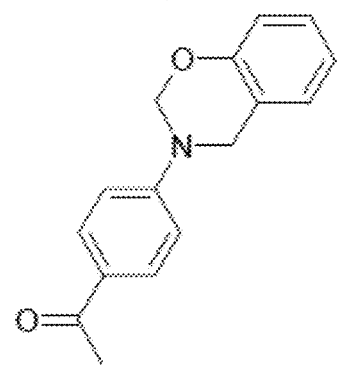
Figure 6:
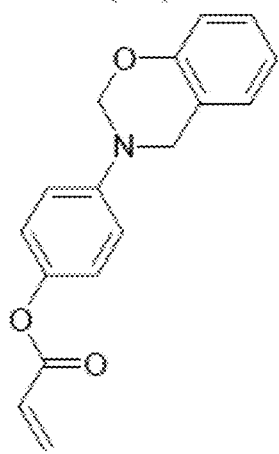
Figure 6:
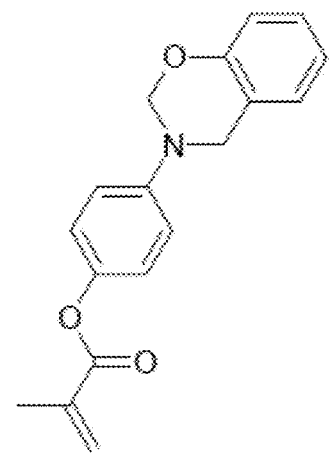

FIG. 6 shows six examples of monobenzoxazines of formula (A) above with various examples of radicals R, of particular formulae (a-1) to (a-6). It will be noted in particular that those of formulae (a-4), (a-5) and (a-6) have the ability of polymerizing at low temperature, i.e. without opening of the oxazine rings, by virtue of the presence of unsaturated double bonds in the molecule. Those of formulae (a-1), (a-2) and (a-3) require opening of the oxazine rings to be able to polymerize.

According to another preferential variant, the benzoxazine is a bis-benzoxazine corresponding to formula:

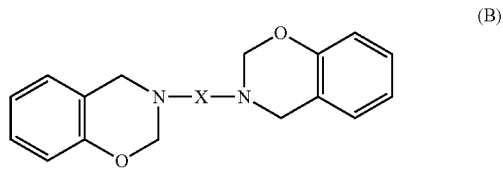

(B)

in which X represents an at least divalent, aliphatic, cycloaliphatic or aromatic bonding group, including at least one carbon atom.

In the above formula (B), X represents a bonding group (spacer) which is at least divalent, that is to say that it might include more than two covalent bonds, for example three or four covalent bonds. Preferably, Z is divalent, that is to say it includes only two covalent bonds.

This group X, which may be saturated or unsaturated, includes by definition at least one (i.e. one or more) carbon atom. According to a particular embodiment of the invention, X represents an aliphatic group including 1 to 20, more preferentially 1 to 12 carbon atoms, or a cycloaliphatic group including 3 to 20, more preferentially 3 to 12 carbon atoms, or an aromatic group including 6 to 30, more preferentially 6 to 20 carbon atoms.

FIG. 7 recalls the general scheme for the synthesis, starting with three compounds, phenol, paraformaldehyde and a specific diamine, of a bis-benzoxazine of formula (B) (monomer noted "M").

FIG. 8 shows the particular formulae (b-1) to (b-3) of three bis-benzoxazines of formula (B) above with various bonding groups Z, in this instance, by way of example, of the aliphatic type which may include a heteroatom, or of the (at least partly) aromatic type.

According to another preferential variant, the benzoxazine is a bis-benzoxazine corresponding to formula:

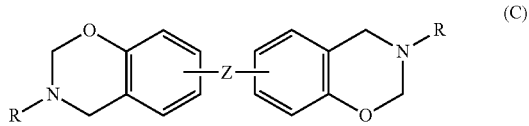

(C)

in which Z represents an at least divalent bonding group and the two radicals R, which may be identical or different, represent a hydrocarbon-based radical which may include a heteroatom (for instance O, S, N or P).

Z may be, for example, a radical including at least one (i.e. one or more) saturated or unsaturated carbon atoms, as defined previously for formula (B) above. Z may also represent a (at least one) heteroatom, for instance O, S, N or P (in particular O or S) directly connected to each benzene nucleus of the two oxazine rings, as illustrated, for example, in FIG. 9 which follows in formulae (e-3) and (e-4).

The two radicals R, which may be identical or different, represent a hydrocarbon-based radical as defined previously for formula (A) above, which may include a heteroatom (for instance S, O, N and P), notably an alkyl (for example methyl), cycloalkyl (for example hexyl) or aryl (for example phenyl), which may include a heteroatom, for instance S, O, N and P or, by way of example, unsaturated double or triple bonds.

According to a more particular variant, the above bis-benzoxazine of general formula (C) corresponds to the more particular formula (D) below in which Z is then in the position para to the oxygen atom of each oxazine ring:

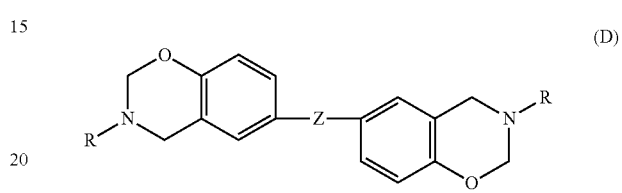

(D)

Even more particularly, the bis-benzoxazine of formula (D) above corresponds to the more particular formula (E) below (in which the two radicals R represent a phenyl group):

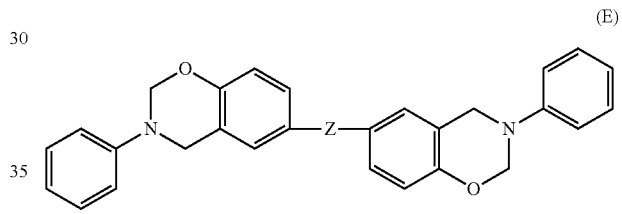

(E)

The attached FIG. 9 shows the particular formulae (e-1) to (e-5) of five bis-benzoxazines of formula (E) above with various bonding groups Z, in this instance, by way of example, of the aliphatic or cycloaliphatic type, or in the form of a heteroatom (O or S). All these compounds are well known to those skilled in the art and are commercially available, for example from the company Huntsman.

In summary, according to a preferential embodiment, the benzoxazine is a bis-benzoxazine corresponding to at least one of the formulae (B) or (C) as described above, general formula (C) being more preferentially represented by formula (D), even more preferentially by formula (E). According to a second preferential embodiment, the benzoxazine layer (12) includes at least one (i.e. one or more) benzoxazine polymer (or polybenzoxazine).

According to a more particular variant, this benzoxazine polymer is a polybenzoxazine in which the repeating units include at least one unit corresponding to formula (F-I) and/or, after opening of the oxazine rings, to formula (F-II) below:

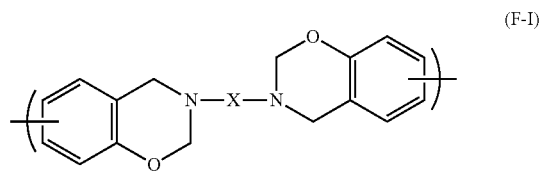

(F-I)

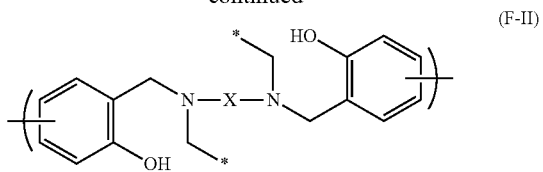
(F-II)

in which X has the definition given above for the benzoxazines of formula (B), i.e. it represents an at least divalent, aliphatic, cycloaliphatic or aromatic bonding group, including at least one (i.e. one or more) carbon atom and which may include a heteroatom (for instance S, O, N or P), or, by way of example, unsaturated double or triple bonds.

The term "polybenzoxazine" should be understood in this instance as meaning any homopolymer or copolymer, notably a block copolymer, of benzoxazine with repeating structural units including at least one unit of formula (F-I) or (F-II) above; needless to say, the polybenzoxazine may include both units of formula (F-I) and units of formula (F-II). This definition (possible mixture of repeating units with closed oxazine rings and of repeating units with open oxazine rings) applies to all the polybenzoxazines described in the present patent application, irrespective of the repeating structural units concerned, notably those of formulae (G) and (H) below.

In formula (F-II) above and throughout the present patent application, a person skilled in the art will immediately understand that the two symbols "*" (which may be identical or different) represent any attachment of the unit to a carbon atom or to a heteroatom (preferably chosen from O, S, N and P), which attachment or bond results from the opening of the oxazine rings.

A person skilled in the art will readily understand that such a polybenzoxazine of formula (F-I) and/or (F-II) may notably be obtained from a bis-benzoxazine corresponding to formula (B) described previously.

FIG. 10 shows the particular formulae (f-1) and (f-2) of the repeating units of two polybenzoxazines of respective general formulae (F-I) and (F-II) above, Z representing here a phenylene group.

According to another particular variant, this benzoxazine polymer is a polybenzoxazine in which the repeating units include at least one unit corresponding to formula (G-I) and/or, after opening of the oxazine rings, corresponding to formula (G-II) below:

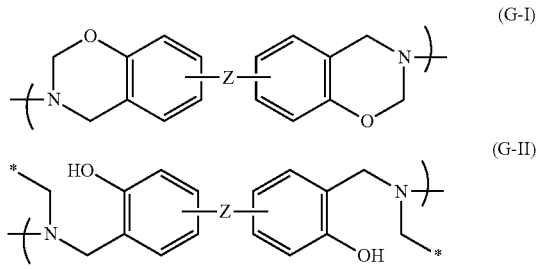
(G-I)

(G-II)

in which Z represents an at least divalent bonding group, the definition of which has already been given for the preceding formula (C).

Z may be, for example, a radical including at least one (i.e. one or more) carbon atom, in particular an aliphatic, cycloaliphatic or aromatic hydrocarbon-based group, which may include a heteroatom, for instance S, O, N or P, or, by way of example, unsaturated double or triple bonds. Z may also represent a (at least one) heteroatom, for instance O, S, N or P (in particular O or S) directly connected to each benzene nucleus of the two oxazine rings.

It will be readily understood that such a polybenzoxazine may notably be obtained from a bis-benzoxazine corresponding to formula (C) described above.

Even more particularly, the benzoxazine polymer is a polybenzoxazine, the repeating units of which of formula (G) above correspond to formula (H-I) and/or, after opening of the oxazine rings, to formula (H-II) below in which Z is in the position para to the oxygen of each oxazine ring:

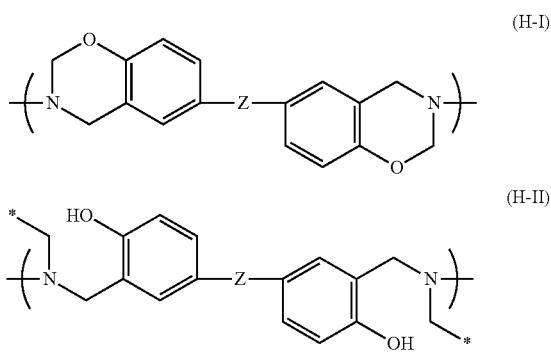
(H-I)

(H-II)

It will be readily understood that such a polybenzoxazine may notably be obtained from a bis-benzoxazine corresponding to formula (D) described above.

In each of the formulae (A), (B), (C), (D), (E), (F-I), (F-II), (G-I), (G-II), (H-I) and (H-II) described above, one or more hydrogen atoms of at least one or of each benzene nucleus of the two oxazine rings, or of any other possible benzene nucleus (for example a central phenylene group) present on the benzoxazine and/or polybenzoxazine molecule, may optionally be substituted, for example as regards the benzoxazine monomers, with functional groups that are capable of promoting, for example, their homopolymerization at low temperature (i.e. without opening of the oxazine rings), for example, as regards the polybenzoxazines, with functional groups that are capable of further promoting the adhesion of the polymer to the GRC or to the thermoplastic material (14).

As thermosetting polyester resin, use is preferably made of a vinyl ester resin, more preferentially of the epoxy vinyl ester type.

Use is even more preferentially made of a vinyl ester resin, notably of the epoxide type, which is at least partly based on novolac (also known as phenoplast) and/or bisphenol (that is to say, grafted to a structure of this type), i.e. preferentially a vinyl ester resin based on novolac, bisphenol, or novolac and bisphenol.

An epoxy vinyl ester resin based on novolac (the part between the square brackets in formula I below) corresponds, for example, in a known manner, to formula (I) below:

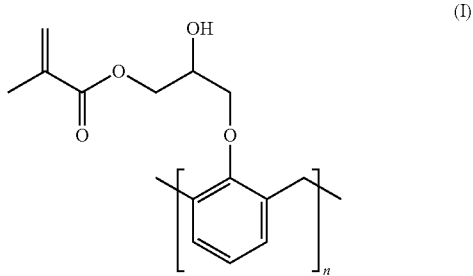

(I)

An epoxy vinyl ester resin based on bisphenol A (the part between the square brackets of formula (II) below) corresponds, for example, to the formula (the "A" serving as a reminder that the product is manufactured using acetone):

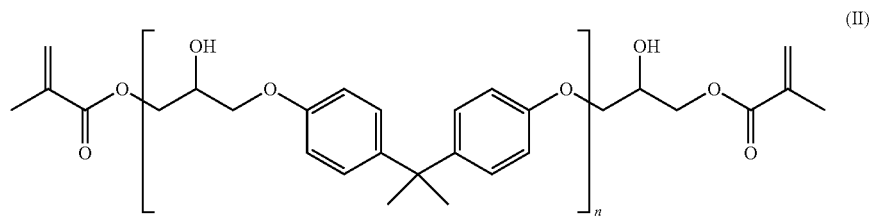

(II)

An epoxy vinyl ester resin of novolac and bisphenol type has shown excellent results. By way of example of such a resin, mention may notably be made of the vinyl ester resins "Atlac 590" and "E-Nova FW 2045" from the company DSM (diluted with approximately 40% styrene) described in the abovementioned patent applications EP-A-1 074 369 and EP-A-1 174 250. Epoxy vinyl ester resins are available from other manufacturers, for instance AOC (USA—"Vipel" resins).

The starting elementary GRC monofilaments, of which the multicomposite material or reinforcer obtained according to the invention is constituted, are well known; they may be manufactured, and this is preferential, according to known processes described in the abovementioned patent applications WO 2015/014578, WO 2015/014579, WO 2015/090973, WO 2015/165777, WO 2016/116457, WO 2016/189209 and WO 2016/189126.

As a reminder, such processes include at least the following steps:
  producing a rectilinear arrangement of glass fibres (filaments) and conveying this arrangement in a direction of forward progression;
  in a vacuum chamber, degassing the arrangement of fibres by the action of the vacuum;
  at the outlet of the vacuum chamber, after degassing, passing through an impregnation chamber under vacuum so as to impregnate said arrangement of fibres with a thermosetting polyester resin (or resin composition), in the liquid state, in order to obtain a prepreg containing the glass filaments and the resin;
  passing said prepreg through a sizing die having a cross section of predefined area and shape, to give it the shape of a monofilament (for example a monofilament with a round cross section or a strip with a rectangular cross section);
  downstream of the die, in a UV irradiation chamber, polymerizing the resin under the action of the UV rays;
  then winding the monofilament thus obtained, for intermediate storage.

All the above steps (arranging, degassing, impregnating, sizing, polymerizing and final winding) are steps which are well known to those skilled in the art, as are the materials (multifilament fibres and resin compositions) used; they have been described in detail in the international patent applications mentioned previously.

It will be recalled notably that before any impregnation of the fibres, a step of degassing the arrangement of fibres by the action of the vacuum is preferentially performed, in order notably to boost the effectiveness of the subsequent impregnation, and above all to guarantee the absence of bubbles within the final composite monofilament. After passing through the vacuum chamber, the glass filaments enter an impregnation chamber which is completely full of impregnation resin and thus devoid of air: it is in this sense that this impregnation step can be termed "impregnation under vacuum".

As already indicated, the starting polyester resin (or resin composition) used is, by definition, a crosslinkable (i.e. curable) resin which is capable of being crosslinked or cured by any known method, for example photochemically or else by UV (or UV-visible) radiation, preferably emitting in a spectrum ranging at least from 300 nm to 450 nm.

This impregnation resin preferably includes a photoinitiator which is sensitive (reactive) to UV radiation above 300 nm, preferably between 300 and 450 nm. This photoinitiator, preferably of the family of phosphine compounds, is used in a preferential content of from 0.5% to 3%, more preferentially from 1% to 2.5%. It may also include a crosslinking agent, for example in a content of between 5% and 15% (weight percentage of impregnation composition).

The "sizing" die makes it possible, by having a cross section of determined dimensions, generally and preferably circular or rectangular (including square), or even oblong, to adjust the proportion of resin relative to the glass fibres while at the same time imposing on the prepreg the shape and thickness targeted for the monofilament.

The polymerization or UV irradiation chamber subsequently has the role of polymerizing or crosslinking the resin under the action of the UV radiation. It includes one or preferably several UV irradiators, each composed, for example, of a UV lamp with a wavelength of 200 to 600 nm.

The final GRC monofilament thus formed through the UV irradiation chamber, in which the resin is now in the solid state, is then recovered for example on a take-up reel, on which it may be wound over a very great length.

Finally, a finished, manufactured composite block as depicted in FIG. 1 is obtained, in the form of a continuous GRC monofilament (10) of diameter $D_M$, having a very long length relative to its cross section (definition of a "reinforcer"), the individual glass filaments (101) of which are distributed homogeneously throughout the volume of cured polyester resin (102).

Preferentially, the weight proportion of glass fibres in this GRC monofilament is between 60% and 80%, preferably between 65% and 75%. This weight proportion is calculated from the ratio of the yarn count of the initial glass fibre to the yarn count of the GRC monofilament. The yarn count (or linear density) is determined on at least three samples, each corresponding to a length of 50 m, by weighing this length; the yarn count is given in tex (weight in grams of 1000 m of product—as a reminder, 0.111 tex is equal to 1 denier).

Preferably, the density (or mass per unit volume) of this GRC monofilament is between 1.8 and 2.1. It is measured (at 23° C.) by means of a specialized "PG503 DeltaRange" balance from the company Mettler Toledo; the samples, of a few cm, are successively weighed in air and immersed in ethanol, the software of the apparatus then determines the mean density over three measurements.

The glass transition temperature of the thermoset polyester resin is preferably greater than 150° C., more preferentially greater than 170° C., in particular greater than 190° C.; its initial tensile modulus, measured at 23° C., is greater than 3.0 GPa, more preferentially greater than 3.5 GPa.

The glass transition temperatures (Tg) are measured in a known manner by DSC (Differential Scanning calorimetry), at the second pass, for example, and unless otherwise indicated in the present patent application, according to the standard ASTM D3418 of 1999 ("822-2" DSC apparatus from Mettler Toledo; nitrogen atmosphere; samples first brought from room temperature (20° C.) to 250° C. (10° C./min), then rapidly cooled down to 20° C., before final recording of the DSC curve from 20° C. to 250° C., at a ramp of 10° C./min).

As already indicated, the process of the invention, for adhering the (at least one) GRC monofilament (10) thus terminated to the thermoplastic material (14) finally covering said monofilament, includes at least the following steps:

impregnating the monofilament (10) with a benzoxazine resin (12) in the liquid state;

after impregnation, heat-treating the monofilament (10) thus impregnated, so as to at least partly polymerize the benzoxazine resin (12);

depositing, onto the monofilament (10) thus adhesively coated, the thermoplastic material (14) in the molten state;

after cooling, optionally heat-treating the monofilament thus coated (R-1, R-2) to totally polymerize the benzoxazine resin (12) on contact with the thermoplastic material (14).

The (at least one) monofilament is thus first impregnated with benzoxazine (12), via any impregnation method known to those skilled in the art suited to the particular case performed (spraying, application by brush, passage through a bath or a die, to mention but a few examples) in which the starting benzoxazine resin or resin composition is in a liquid form. The process is preferably performed by passing the GRC monofilament, or even, depending on the case, several GRC monofilaments arranged in parallel, through an impregnation bath containing the benzoxazine resin (or resin composition) in liquid form, and then, if necessary, draining, for example through a sizing die as described previously for the manufacture of the monofilament itself. A heat treatment step for at least partial polymerization of the resin (and, if need be, drying) is finally performed.

For the above impregnation step, the benzoxazine resin or resin composition is first placed in liquid form via any suitable method, for example by dissolution in an organic solvent (or mixture of solvents), for instance acetone, cyclohexane or toluene, and/or else thermally at a temperature typically greater than 100° C., preferably between 100 and 150° C., in particular and advantageously in the presence of a plasticizer such as ATBN ("amine-terminated butadiene acrylonitrile"), PEG (polyethylene glycol) or PPG (polypropylene glycol) which promotes the impregnation by lowering the viscosity. Preferentially, the liquid solution of benzoxazine resin includes at least one organic solvent and/or plasticizer.

After impregnation (and, if need be, draining), the heat treatment conditions (temperature and time) (including optional drying in the presence of a solvent) for the at least partial polymerization of the resin or resin composition will, needless to say, be adapted to the particular cases implemented of the invention, it being understood that these conditions will depend on a very large number of factors: nature of the benzoxazine (or benzoxazine composition), presence or absence of polymerization catalysts, polymerization method used (thermal, photochemical, radiation), targeted thickness of the benzoxazine layer, subsequent application intended for the object of the invention. The temperature of, at least partial, polymerization of the benzoxazine resin is preferentially greater than 100° C., more preferentially greater than 150° C.

Preferably, only one pre-polymerization (i.e. partial polymerization) of the benzoxazine is performed since the multicomposite material or reinforcer thus prepared is not the finished manufactured product, but is intended to subsequently receive the second layer (14) of thermoplastic material.

According to a preferential embodiment, in the case, for example, of a relatively thin layer, the minimum thickness (Eb) of the benzoxazine layer (12) covering the (or each) GRC monofilament is between 0.5 and 50 μm, preferably between 1 and 10 μm.

According to another preferential embodiment, in the case, for example, of a relatively thick layer, the minimum thickness (Eb) of the benzoxazine layer (12) covering the (or each) GRC monofilament is within a range from 0.05 to 1.0 mm, preferably between 0.1 and 0.5 mm.

Once the GRC monofilament (10) has been coated with its benzoxazine layer (12), the whole is then covered or sheathed with the layer of thermoplastic material (14) in accordance with the process of the invention, for example by passing the monofilament, or even, where appropriate, several monofilaments placed in parallel, through a suitable extrusion head delivering the thermoplastic material in the molten state.

For the deposition of this thermoplastic material, the process may be performed as indicated, for example, in the international patent applications WO 2015/090973, WO 2015/165777, WO 2016/116457, WO 2016/189209 and WO 2016/189126 cited in the introduction of the present specification.

This sheathing step consists, for example, simply in passing the or each monofilament (10) (already coated with benzoxazine) through one or more dies of suitable diameter, through extrusion heads heated to suitable temperatures, or else through a coating bath containing the thermoplastic material predissolved in a suitable organic solvent (or mixture of solvents).

On exiting each extrusion head, the monofilament(s) thus sheathed are then cooled sufficiently so as to solidify the layer of thermoplastic material, for example with air or another cold gas, or by passing through a water bath, followed by a drying step.

After cooling, the monofilament thus sheathed (R-1, R-2) is optionally heat-treated to totally polymerize the benzoxazine resin on contact with the thermoplastic material. The temperature of total polymerization is preferentially greater than 150° C., more preferentially greater than 200° C., even more preferentially greater than 250° C.

By way of example, covering a GRC monofilament (10) coated with its benzoxazine adhesive layer (thickness Eb of a few μm or a few tens of μm), with a diameter close to 1 mm with a layer of polyester (for example PET or PBT) with a minimum thickness Et equal to about 0.2 mm, to obtain a final multicomposite reinforcer (R-2) having a total diameter of about 1.4 mm, is performed on an extrusion/sheathing line including two dies, a first die (counter-die or upstream die) having a diameter equal to about 1.05 mm and a second die (or downstream die) having a diameter equal to about 1.45 mm, both dies being positioned in an extrusion head brought to about 290° C. The polyester, which melts at a temperature of 280° C. in the extruder, thus covers the monofilament, via the sheathing head, at a yarn throughput speed typically equal to several tens of m/min, for an extrusion pump flow rate typically of several tens of cm3/min. On exiting this sheathing operation, the yarn may be immersed in a cooling tank filled with cold water, in order to solidify and set the polyester in its amorphous state, then dried for example in-line by an air nozzle, or by passing the take-up reel into the oven.

FIG. 11 depicts, in cross section, another example (R-4) of a multicomposite material or reinforcer obtained in accordance with the invention, also of rectangular cross section, in the form of a strip of three parallel GRC monofilaments (10*a*, 10*b*, 10*c*), each coated with their first layer (12) of benzoxazine and with the second layer (14) of thermoplastic material (in particular polyester) as final peripheral sheathing layer.

Preferably, the layer or sheath (14) consists of a thermoplastic material whose glass transition temperature is greater than 20° C., preferably greater than 50° C., more preferentially greater than 70° C. Moreover, the melting point (Tm) of this thermoplastic material is preferably greater than 150° C., more preferentially greater than 200° C.

Preferentially, the minimum thickness (denoted Et) of the layer of thermoplastic material covering the or each monofilament is between 0.05 and 0.5 mm, more preferentially between 0.1 and 0.4 mm, in particular between 0.1 and 0.3 mm.

Preferentially, the initial tensile modulus of this layer of thermoplastic (14) is between 500 and 2500 MPa, preferably between 500 and 1500 MPa; its elastic elongation is preferably greater than 5%, more preferentially greater than 8%, in particular greater than 10%; its elongation at break is preferably greater than 10%, more preferentially greater than 15%, in particular greater than 20%.

Typically, the thermoplastic material is a polymer or a polymeric composition (composition based on at least one polymer and on at least one additive); this thermoplastic polymer is preferably chosen from the group consisting of polyamides, polyesters, polyimides and mixtures of such polymers, more particularly from the group consisting of aliphatic polyamides, polyesters, and mixtures of such polymers. Among the aliphatic polyamides, mention may notably be made of polyamides 4-6, 6, 6-6, 11 or 12.

The thermoplastic material is more preferentially a polyester or a polyester composition (composition based on at least one polyester and at least one additive); among the preferential polyesters, mention may be made in particular of those chosen from the group consisting of PET (polyethylene terephthalate), PEN (polyethylene naphthalate), PBT (polybutylene terephthalate), PBN (polybutylene naphthalate), PPT (polypropylene terephthalate), PPN (polypropylene naphthalate), and mixtures of such polyesters.

Various additives such as a dye, filler, plasticizer, antioxidant or other stabilizer may be optionally added to the above polymer or mixture of polymers in order to form a polymeric composition.

By virtue of the combined presence of its glass filaments, of the polyester resin matrix, of the benzoxazine adhesive intermediate layer, and finally of the outer thermoplastic sheath serving a hooping function here, the multicomposite material or reinforcer obtained according to the invention (R-4) is characterized by improved transverse cohesion, and high dimensional, mechanical and thermal stability.

As already mentioned previously, the composite material or reinforcer obtained in accordance with the invention may include only one or a plurality of GRC monofilaments (10). In the case where several monofilaments are used, the benzoxazine layer (12) and/or the layer of thermoplastic material (14) may be deposited individually onto each of the monofilaments (10) as represented, for example, in FIG. 2, or else deposited collectively onto several appropriately arranged monofilaments (10), for example aligned in a main direction, as shown, for example, in FIG. 11.

The thermoplastic, and therefore hot-melt, nature of the material (14) covering at its periphery each material or reinforcer obtained according to the invention very advantageously makes it possible to manufacture, by thermal bonding, a wide variety of multicomposite materials or reinforcers from several reinforcers (R-2, R-4) having various shapes and cross sections, by at least partial melting of the covering material (14), then cooling of all of the reinforcers (R-2, R-4) sheathed in thermoplastic material (14) once the latter have been placed together, arranged in an appropriate manner. This at least partial melting will be performed at a temperature preferentially between the melting point Tm of the thermoplastic material (14) and the glass transition temperature of the thermoset polyester resin (102).

Preferably, the multicomposite material or reinforcer obtained according to the invention as described previously, a finished manufactured product, has an elongation at break of greater than 3.0%, more preferentially greater than 3.5%; in this material or reinforcer, the initial tensile modulus of the or of each GRC monofilament is preferably greater than 30 GPa, more preferentially greater than 33 GPa.

The above tensile mechanical properties are measured at 23° C. using an "Instron" 4466 type tensile testing machine (BLUEHILL-2 software supplied with the tensile testing machine), according to the standard ASTM D 638, on multicomposite materials or GRC monofilaments as manufactured, that is to say which have not been sized, or else sized (that is to say ready to use), or else extracted from the semi-finished product or article made of rubber that they reinforce. Before measurement, these multicomposite materials or these GRC monofilaments are subjected to prior conditioning (storage for at least 24 hours in a standard atmosphere according to the European standard DIN EN 20139 (temperature of 23±2° C.; relative humidity of 50±5%). The samples tested are subjected to a tensile force over an initial length of 400 mm at a nominal speed of 100 m/min, under a standard pretension of 0.5 cN/tex. All the results given are an average over 10 measurements.

Preferably, the diameter $D_R$ is between 0.3 and 50 mm, more preferentially within a range from 0.5 to 30 mm, depending on the type of application intended.

Thus, according to a particular embodiment, notably when it is intended for reinforcing a multilayer laminate as described subsequently, the diameter $D_R$ of this material or reinforcer according to the invention is preferably between 0.3 and 3.0 mm, more preferentially between 0.4 and 2.5 mm, in particular between 0.5 and 2.2 mm. According to other possible particular applications, the diameter $D_R$ could, of course, be very much greater, for example between 3 and 50 mm, notably within a range from 5 to 30 mm.

This definition of "diameter" equally covers multicomposite objects of essentially cylindrical shape (with circular cross section) and multicomposite objects of other shapes, for example of oblong shape (a more or less flattened shape) or of rectangular (including square) cross section. In the case of a non-circular cross section, as depicted, for example, in FIG. 2 (reinforcer R-1), $D_R$ is by convention the thickness of the multicomposite material or reinforcer; Eb and Et are, in this case, the minimum thicknesses measured "at the back" of the monofilament, i.e. at the narrowest (or thinnest) point, as depicted in FIGS. 2 and 11.

FIG. 12 shows, in cross section, an example of a multilayer laminate (30) including a multicomposite reinforcer (R-4 as described in FIG. 11), consisting of three GRC monofilaments (10a, 10b, 10c) individually coated with a layer of benzoxazine (12) and then sheathed, this time collectively, with the layer (14) of thermoplastic material, this reinforcer R-4 obtained according to the invention being itself finally coated with a rubber, notably a diene rubber, sheath (16) to constitute this multilayer laminate.

This light and efficient multilayer laminate, which is resistant to corrosion, notably makes it possible to advantageously replace the conventional plies reinforced with steel cords used in pneumatic tyres.

Each layer of rubber composition, or "rubber layer" hereinbelow, of which the multilayer laminate is formed is based on at least one elastomer, preferably of the diene type chosen, for example, from the group consisting of polybutadienes (BR), natural rubber (NR), synthetic polyisoprenes (IR), various butadiene copolymers, various isoprene copolymers, and mixtures of these elastomers. The rubber layer may also include all or some of the additives usually used in rubber matrices intended for the manufacture of tyres, for instance reinforcing fillers such as carbon black or silica, coupling agents, anti-ageing agents, antioxidants, plasticizers or extender oils, tackifying resins, anti-reversion agents, a crosslinking or vulcanization system.

In order to adhere the rubber to the thermoplastic material layer, use may be made of any appropriate adhesive system, for example a textile adhesive of the "RFL" (resorcinol-formaldehyde-latex) type including at least one diene elastomer such as natural rubber, or any equivalent adhesive known for imparting satisfactory adhesion between rubber and conventional textile fibres. By way of example, the adhesive coating process may essentially include the following successive steps: passage through a bath of adhesive, followed by draining (for example by blowing, sizing) to remove the excess adhesive; then drying, for example by passing into an oven or heating tunnel (for example for 30 s at 180° C.) and finally heat treatment (for example for 30 s at 230° C.).

A person skilled in the art will readily understand that the connection between, on the one hand, the thermoplastic material layer (14) and, on the other hand, each rubber layer with which it is in contact in the multilayer laminate is ensured definitively during the final curing (crosslinking) of the rubber article, notably tyre, for which the laminate is intended.

Examples of Implementation of the Invention

Examples of the manufacture of GRC monofilaments, then of the manufacture, according to the invention, of multicomposite reinforcers based on these GRC monofilaments are described hereinbelow.

The attached FIG. 13 firstly very simply depicts an example of a device 100 for producing GRC monofilaments (10) as shown in FIG. 1.

In this figure, a reel 110 can be seen, containing, in the example illustrated, glass fibres 111 (in the form of multifilaments). The reel is unwound continuously by entrainment so as to produce a rectilinear arrangement 112 of these fibres 111. In general, the reinforcing fibres are delivered as "rovings", that is to say already in groups of fibres wound in parallel on a reel; for example, fibres sold by Owens Corning under the fibre name "Advantex" are used, with a yarn count equal to 1200 tex (as a reminder, 1 tex corresponds to 1 g/1000 m of fibre). It is, for example, the tension exerted by the rotating receiver 126 which will enable the fibres to advance in parallel and enable the GRC monofilament to advance along the entire length of the facility 100.

This arrangement 112 then passes through a vacuum chamber 113 (connected to a vacuum pump, not shown), arranged between an inlet tubing 113a and an outlet tubing 113b which opens preferably into an impregnation chamber 114, the two tubings preferably with rigid walls having, for example, a minimum cross section greater than (typically twice as large as) the total cross section of the fibres and a length very much greater than (typically 50 times greater than) said minimum cross section.

As already taught by the patent applications mentioned in the introduction of the present specification, the use of tubings with rigid walls both for the inlet opening into the vacuum chamber and for the outlet opening of the vacuum chamber and the transfer from the vacuum chamber to the impregnation chamber proves to be compatible at the same time with high passage rates of the fibres through the openings without breaking the fibres, and also makes it possible to ensure sufficient sealing. All that is required, if need be experimentally, is to find the largest flow cross section, given the total cross section of the fibres to be treated, that will still allow sufficient sealing to be achieved, given the rate of advance of the fibres and the length of the tubings. Typically, the vacuum inside the chamber 113 is, for example, of the order of 0.1 bar, and the length of the vacuum chamber is approximately 1 metre.

On exiting the vacuum chamber 113 and the outlet tubing 113b, the arrangement 112 of fibres 111 passes through an impregnation chamber 114 comprising a feed tank 115 (connected to a metering pump, not shown) and a sealed impregnation tank 116 completely full of impregnation composition 117 based on a curable resin of the vinyl ester type (e.g. "E-Nova FW 2045" from DSM). By way of example, the composition 117 also includes (in a weight content of 1% to 2%) a photoinitiator suitable for UV and/or UV-visible radiation with which the composition will subsequently be treated, for example bis(2,4,6-trimethylbenzoyl)phenylphosphine oxide ("Irgacure 819" from the company BASF). It may also include (for example approximately 5% to 15% of) a crosslinking agent, for instance tris(2-hydroxyethyl)isocyanurate triacrylate ("SR 368" from the company Sartomer). Needless to say, the impregnation composition 117 is in the liquid state.

Preferentially, the impregnation chamber is several metres long, for example between 2 and 10 m, in particular between 3 and 5 m.

Thus, a prepreg which includes, for example (as a weight percentage), from 65% to 75% solid fibres 111, the remainder (25% to 35%) being formed of the liquid impregnation matrix 117, leaves the impregnation chamber 114 in a sealed outlet tubing 118 (still under a primary vacuum).

The prepreg then passes through sizing means 119 including at least one sizing die 120, the passage of which (not shown here), for example of circular, rectangular or even conical shape, is suited to the specific implement conditions. By way of example, this passage has a minimum cross section of circular shape, the downstream orifice of which has a diameter slightly larger than that of the targeted monofilament. Said die has a length which is typically at least 100 times greater than the minimum dimension of the minimum cross section. Its purpose is to give the finished product good dimensional precision, and may also serve to meter the fibre content with respect to the resin. According to one possible implementation variant, the die 120 can be directly incorporated into the impregnation chamber 114, thereby avoiding, for example, the need to use the outlet tubing 118.

Preferentially, the sizing zone is several centimetres long, for example between 5 and 50 cm, in particular between 5 and 20 cm.

By virtue of the sizing means (119, 120) a "liquid" composite monofilament (121), liquid in the sense that its impregnation resin is still liquid at this stage, is obtained at this stage, the shape of the cross section of which is preferably essentially circular.

At the outlet of the sizing means (119, 120), the liquid composite monofilament (121) thus obtained is then polymerized by passing through a UV irradiation chamber (122) including a sealed glass tube (123) through which the composite monofilament moves; said tube, the diameter of which is typically a few cm (for example 2 to 3 cm), is irradiated by a plurality of (here, for example, 4) UV irradiators (124) in a row ("UVAprint" lamps from the company Dr. Hönle, with a wavelength of 200 to 600 nm) arranged a short distance (a few cm) away from the glass tube. Preferentially, the irradiation chamber is several metres long, for example between 2 and 15 m, in particular between 3 and 10 m. The irradiation tube 123 in this example has a stream of nitrogen flowing through it.

The irradiation conditions are preferentially adjusted so that, at the outlet of the impregnation chamber, the temperature of the GRC monofilament measured at the surface thereof (for example by means of a thermocouple) is greater than the Tg (TO of the crosslinked resin (in other words greater than 150° C.) and more preferentially less than 270° C.

Once the resin has polymerized (cured), the GRC monofilament (125), which is now in the solid state and entrained in the direction of the arrow F, then arrives at the final take-up reel thereof (126).

Finally, a finished, manufactured composite block as depicted in FIG. 1 is obtained, in the form of a continuous, very long GRC monofilament (10), the individual glass filaments (101) of which are distributed homogeneously throughout the volume of cured resin (102). Its diameter is, for example, equal to about 1 mm. The process described above may be performed at high speed, preferably greater than 50 m/min, for example between 50 and 150 m/min.

It was then coated with a benzoxazine layer (12), by impregnation in a (liquid) bath of solvent (acetone) including 20% by weight of a commercial benzoxazine resin composition ("XU 35910" from the company Huntsman), this composition including the actual benzoxazine resin (85%) and, as additives, an epoxy hardener ("CY179"; 6%) for increasing the Tg of the benzoxazine layer once crosslinked, and a plasticizer of the ATBN type ("Hypro 1300X16 ATBN"; 9%) to reduce the viscosity of the impregnation liquid.

The above starting benzoxazine was a thiodiphenol-based bis-benzoxazine corresponding to formula (e-3) of FIG. 9 (in the closed oxazine ring configuration):

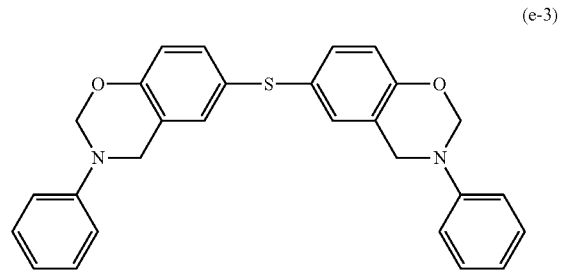 [SMILES: c1ccc(N2COc3ccc(Sc4ccc5c(c4)CN(c4ccccc4)CO5)cc3C2)cc1]

(e-3)

On exiting the bath, the GRC monofilament thus impregnated with benzoxazine was dried and pre-polymerized by passing (20 m/min) through a heating tunnel (30 s at 180° C.), to produce a multicomposite material with, at this stage, its benzoxazine layer in a pre-polymerized state.

Then, thus coated with its pre-polymerized benzoxazine layer (12), the GRC monofilament was subsequently subjected to an additional sheathing operation with a thermoplastic polyester material, in this instance a PBT ("Riteflex 677" from the company Ticona-Celanese; density equal to 1.29; Tg equal to about 54° C.; melting point equal to about 220° C.) by passing (10 m/min) through an extrusion line (Maillefer "NMA30" extruder (Switzerland); extrusion head brought to about 290° C.) followed by cooling to room temperature, as already described previously, and also in the abovementioned patent applications WO 2015/090973, WO 2015/165777, WO 2016/116457, WO 2016/189209 and WO 2016/189126.

Thus obtained as a finished manufactured product, equipped with its two layers, a first layer of benzoxazine (12), on the one hand, and a second layer of PBT (14), on the other hand, as illustrated in FIG. 2, the reinforcer (R-2) obtained according to the process of the invention had the following final properties (measured at 23° C.):

$D_M$ equal to about 1.0 mm; Eb equal to about 3 μm; Et equal to about 0.2 mm; $D_R$ equal to about 1.4 mm; elongation at break equal to about 3.8%; initial tensile modulus equal to about 45 GPa; weight proportion of glass fibers in the monofilament equal to about 70%; initial tensile modulus of the thermoset vinyl ester resin equal to about 3.5 GPa; Tg and flexural modulus of the benzoxazine resin respectively equal to about 215° C. and 3.5 GPa; initial tensile modulus of the PBT equal to about 1100 MPa; elongation at break of the PBT greater than 10%.

Adhesion tests were then performed in the laboratory on GRC monofilaments coated with benzoxazine as described previously which were precoated, over a length of 40 mm, in a mould containing the thermoplastic material (PBT polyester) in molten form, and then cooled to room temperature. The peel forces (extraction with clips on an "INSTRON3" tensile testing machine) of these GRC monofilaments through the PBT matrix were then measured, in comparison with multicomposite reinforcers of the prior art as described in the abovementioned international patent applications (WO 2015/090973 et seq.).

According to these prior art patent applications, as a reminder, control GRC monofilaments were subjected, before being coated with the polyester thermoplastic material, to a simple adhesive coating operation by passing through an aqueous bath (about 94% of water) essentially based on epoxy resin ("DENACOL" EX-512 polyglycerol polyglycidyl ether from Nagase ChemteX Corporation, about 1%) and on isocyanate compound ("GRILBOND" IL-6 caprolactam-blocked isocyanate compound from EMS, about 5%), this adhesive coating step being followed by drying (30 s at 185° C.) then a heat treatment (30 s at 200° C.).

It was found, unexpectedly, that the peel forces were on average (over 10 measurements) multiplied by close to 2.5 for the reinforcers obtained according to the invention (14.5 MPa versus 5.9 MPa), by virtue of the presence of their benzoxazine layer (12).

The obtained multicomposite material or reinforcer manufactured in this way according to the invention can advantageously be used, notably in the form of a multilayer laminate, for reinforcing semi-finished products or finished articles made of rubber, in particular pneumatic or non-pneumatic tyres for all types of vehicles, in particular passenger vehicles or industrial vehicles such as heavy vehicles, civil engineering vehicles, aircraft and other transport or handling vehicles.

The invention claimed is:

1. A method of bonding a monofilament made of glass-resin composite including glass filaments embedded in a thermoset polyester resin to a thermoplastic material, the method comprising the step of:
using a benzoxazine resin.

2. The method according to claim 1, wherein the benzoxazine resin includes a benzoxazine monomer.

3. The method according to claim 2, wherein the benzoxazine monomer is a monobenzoxazine corresponding to formula (A) in which R represents a hydrocarbon-based radical which may include a heteroatom:

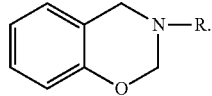
(A)

4. The method according to claim 2, wherein the benzoxazine monomer is a bis-benzoxazine.

5. The method according to claim 4, wherein the bis-benzoxazine corresponds to at least one of the formulae

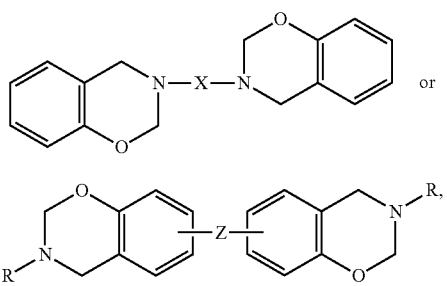
(B)
or
(C)

in which:
X represents an at least divalent, aliphatic, cycloaliphatic or aromatic bonding group, including at least one carbon atom;

Z represents an at least divalent bonding group; and
the two radicals R, which may be identical or different, represent a hydrocarbon-based radical which may include a heteroatom.

6. The method according to claim 1, wherein the benzoxazine resin includes a polybenzoxazine, the repeating units of which include at least one unit corresponding to formula (F-I) or, after opening of the oxazine rings, to formula (F-II),

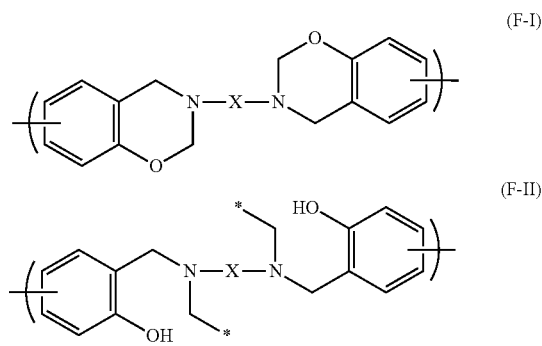
(F-I)
(F-II)

in which X represents an at least divalent, aliphatic, cycloaliphatic or aromatic bonding group, including at least one carbon atom.

7. The method according to claim 1, wherein the benzoxazine resin includes a polybenzoxazine, the repeating units of which include at least one unit corresponding to formula (G-I) or, after opening of the oxazine rings, to formula (G-II),

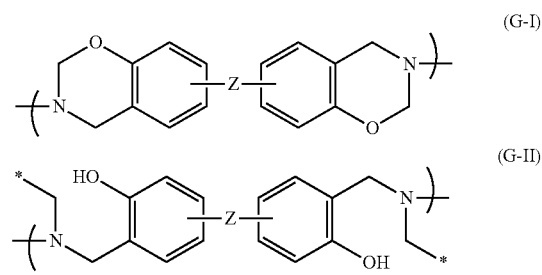
(G-I)
(G-II)

in which Z represents an at least divalent bonding group.

8. The method according to claim 7, wherein the repeating units include at least one unit corresponding to formula (H-I) or, after opening of the oxazine rings, to formula (H-II):

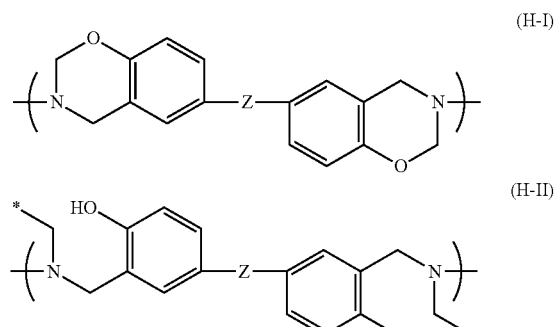
(H-I)
(H-II)

9. The method according to claim 1, wherein the thermoset polyester resin is a vinyl ester resin.

10. The method according to claim 1, wherein the thermoplastic material is a polyester.

11. The method according to claim 10, wherein the polyester is selected from the group consisting of PET (polyethylene terephthalate), PEN (polyethylene naphthalate), PBT (polybutylene terephthalate), PBN (polybutylene naphthalate), PPT (polypropylene terephthalate), PPN (polypropylene naphthalate) and mixtures thereof.

12. A process for adhering a monofilament, made of glass-resin composite including glass filaments embedded in a thermosetting polyester resin, to a thermoplastic material, the process comprising the steps of:
   impregnating the monofilament with a benzoxazine resin in a liquid state;
   after impregnation, heat-treating the monofilament thus impregnated, so as to at least partly polymerize the benzoxazine resin;
   depositing, onto the monofilament thus adhesively coated, the thermoplastic material in a molten state; and
   after cooling, optionally heat-treating the monofilament thus coated to totally polymerize the benzoxazine resin on contact with the thermoplastic material.

13. The process according to claim 12, wherein the benzoxazine resin in the liquid state includes an organic solvent, a plasticizer, or both an organic solvent and a plasticizer.

14. The process according to claim 12, wherein the heat treatment, for the partial polymerization of the benzoxazine resin, is performed at a temperature above 100° C. and below 150° C.

15. The process according to claim 12, wherein the heat treatment, for the total polymerization of the benzoxazine resin, is performed at a temperature above 150° C.

16. The process according to claim 15, wherein the heat treatment, for the total polymerization of the benzoxazine resin, is performed at a temperature above 200° C.

17. The process according to claim 12, wherein the benzoxazine resin is a monobenzoxazine of formula (A)

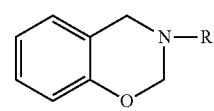

(A)

in which R represents a hydrocarbon-based radical which may include a heteroatom; or of formula (B) or (C)

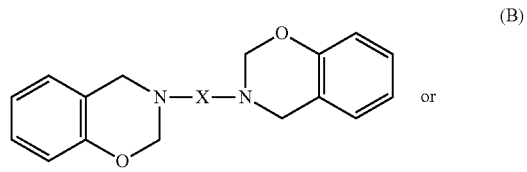

(B)

or

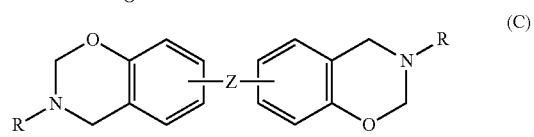

(C)

in which:
   X represents an at least divalent, aliphatic, cycloaliphatic or aromatic bonding group, including at least one carbon atom;
   Z represents an at least divalent bonding group; and
   the two radicals R, which may be identical or different, represent a hydrocarbon-based radical which may include a heteroatom.

* * * * *